US009343954B2

(12) United States Patent
Li et al.

(10) Patent No.: US 9,343,954 B2
(45) Date of Patent: May 17, 2016

(54) MULTI-INPUT DC CONVERTER AND PFC CIRCUIT

(75) Inventors: Zhanwei Li, Shenzhen (CN); Lixiang Liu, Shenzhen (CN)

(73) Assignee: SHENZHEN VAPEL POWER SUPPLY TECH. CO., LTD., Shenzhen, Guangdong (CN)

( * ) Notice: Subject to any disclaimer, the term of this patent is extended or adjusted under 35 U.S.C. 154(b) by 85 days.

(21) Appl. No.: 14/382,240

(22) PCT Filed: Feb. 29, 2012

(86) PCT No.: PCT/CN2012/071752
§ 371 (c)(1),
(2), (4) Date: Oct. 31, 2014

(87) PCT Pub. No.: WO2013/127068
PCT Pub. Date: Sep. 6, 2013

(65) Prior Publication Data
US 2015/0055381 A1     Feb. 26, 2015

(51) Int. Cl.
*H02M 1/42* (2007.01)
*H02M 1/10* (2006.01)
*H02M 3/335* (2006.01)
*H02M 1/00* (2006.01)

(52) U.S. Cl.
CPC *H02M 1/42* (2013.01); *H02M 1/10* (2013.01); *H02M 1/4225* (2013.01); *H02M 1/4258* (2013.01); *H02M 3/33507* (2013.01); *H02M 2001/0083* (2013.01); *Y02B 70/126* (2013.01)

(58) Field of Classification Search
CPC ... H02M 1/32; H02M 3/33569; H02M 3/335; H02M 3/33507; H02M 3/33523; H02M 7/48; H02M 7/537; H02M 7/003

USPC ........... 363/20, 21.01, 21.08, 56.01, 131
See application file for complete search history.

(56) References Cited

U.S. PATENT DOCUMENTS 3,566,236 A * 2/1971 Johnson .................... H03F 5/00
                                                       330/118
3,781,643 A * 12/1973 King ......................... H02M 7/515
                                                       331/113 S
4,060,757 A * 11/1977 McMurray .............. H02M 7/5152
                                                       363/135

(Continued)

FOREIGN PATENT DOCUMENTS

CN        101394091      3/2009
CN        101588129      11/2009

(Continued)

*Primary Examiner* — Adolf Berhane
(74) *Attorney, Agent, or Firm* — Hamre, Schumann, Mueller & Larson, P.C.

(57) ABSTRACT

The application discloses a multi-input DC converter and a PFC circuit. The multi-input DC converter of the application includes n diodes, a transformer, a switching transistor, a rectifier and filter circuit, and a load. The transformer includes a primary winding and a secondary winding, the number of turns of the primary winding is N1, and the primary winding is divided into n sections by leading out n−1 taps in a specific manner; anodes of the n diodes are respectively connected to n input sources in turn, cathodes of the n diodes are respectively connected to a first terminal of the primary winding and n−1 tap terminals in turn, a second terminal of the primary winding is grounded through the switching transistor, and the secondary winding delivers energy to the rectifier and filter circuit and then to the load. The structure is simple, and the cost is low.

10 Claims, 8 Drawing Sheets

(56) References Cited

U.S. PATENT DOCUMENTS

| | | | | | |
|---|---|---|---|---|---|
| 4,382,430 | A | * | 5/1983 | Iwasaki | F02P 3/01 123/606 |
| 4,800,476 | A | * | 1/1989 | Harada | H02M 3/3382 323/290 |
| 5,043,598 | A | * | 8/1991 | Maeda | H04N 3/185 327/538 |
| 5,132,606 | A | * | 7/1992 | Herbert | H02J 9/061 323/266 |
| 6,072,302 | A | * | 6/2000 | Underwood | H02J 3/38 322/17 |
| 6,452,289 | B1 | * | 9/2002 | Lansberry | H02J 3/32 307/25 |
| 7,719,248 | B1 | * | 5/2010 | Melanson | H02M 1/4225 323/222 |
| 2003/0058664 | A1 | * | 3/2003 | Igarashi | H02M 3/337 363/56.12 |
| 2003/0218892 | A1 | * | 11/2003 | Nakagawa | H02M 3/33569 363/56.12 |
| 2004/0252529 | A1 | * | 12/2004 | Huber | H02M 1/4258 363/21.12 |
| 2005/0093373 | A1 | | 5/2005 | Chapman et al. | |
| 2005/0212501 | A1 | * | 9/2005 | Acatrinei | G05F 1/70 323/283 |
| 2007/0247091 | A1 | * | 10/2007 | Maiocchi | H02M 3/156 318/400.04 |
| 2008/0198638 | A1 | * | 8/2008 | Reinberger | H02M 3/3376 363/74 |
| 2010/0026208 | A1 | * | 2/2010 | Shteynberg | H05B 33/0815 315/297 |
| 2011/0115399 | A1 | * | 5/2011 | Sadwick | H05B 33/0818 315/287 |
| 2013/0077362 | A1 | * | 3/2013 | Kumar | H02M 1/4225 363/49 |
| 2014/0265935 | A1 | * | 9/2014 | Sadwick | H05B 33/0848 315/307 |
| 2015/0194877 | A1 | * | 7/2015 | Hsiao | H02M 3/07 363/70 |
| 2015/0207396 | A1 | * | 7/2015 | Ayana | H02M 5/4585 363/37 |

FOREIGN PATENT DOCUMENTS

| | | |
|---|---|---|
| CN | 101656479 | 2/2010 |
| CN | 201504176 | 6/2010 |
| CN | 102097943 | 6/2011 |

* cited by examiner

MULTI-INPUT DC CONVERTER AND PFC CIRCUIT

CROSS REFERENCE TO RELATED APPLICATION

This application is a national application of PCT/CN2012/071752, filed on Feb. 29, 2012. The contents of PCT/CN2012/071752 are all hereby incorporated by reference.

TECHNICAL FIELD

The present application relates to a DC/DC converter, and in particular, to a multi-input DC converter and a PFC circuit to which a two-input DC converter thereof is applied.

BACKGROUND

A current DC/DC converter, as shown in FIG. 1, comprises a transformer T, a switching transistor S1, a diode D, a filter capacitor C and a load R. The transformer T comprises a primary winding N1, and a secondary winding N2. A first terminal of the primary winding N1 of the transformer is connected to a DC input source V, a second terminal of the primary winding N1 is grounded through a switching transistor S1, a first terminal of the secondary winding N2 is connected to an anode of the diode D, a cathode of the diode D is connected to first terminals of the filter capacitor C and the load R, and a second terminal of the secondary winding N2 is connected to second terminals of the filter capacitor C and the load R. In cooperation with the switching transistor S1 which is under control of a PWM pulse wave, the DC/DC converter delivers energy of the DC input source V to the load connected to a secondary terminal through the transformer. However, the DC/DC converter as described above can only implement single power supply. If it is intended to implement power supply of two DC input sources, two DC/DC converters as described above are required. In the prior art, a two-input DC converter circuit is also proposed, for example, in the patent application with Publication No. CN102097943A entitled "two-input DC converter", the proposed two-input DC converter can implement power supply of a two-input power source; however, a circuit structure thereof needs to use more switching transistors, so that many components are used and control is complicated, thereby resulting in a complicated circuit structure and high circuit cost.

SUMMARY

A technical problem to be solved by the embodiments of the present application is to overcome the defects of the prior art, and provide a two-input DC converter, which has a simple circuit structure and lower circuit cost.

A technical problem further to be solved by the embodiments of the present application is to provide a multi-input DC converter, which has a simple circuit structure and lower circuit cost.

A technical problem still further to be solved by the embodiments of the present application is to provide a PFC circuit, to which the two-input DC converter is applied, so as to reduce voltage waveform oscillation of a diode in the PFC circuit, thereby improving the efficiency of the PFC circuit.

The technical problems of the embodiments of the present application are solved through the following technical solution:

A two-input DC converter, supplying power by using one or both of a first input source (V1) and a second input source (V2); and comprising: a first diode (D1), a second diode (D2), a transformer (T), a switching transistor (S1), a rectifier and filter circuit, and a load (R); the transformer (T) comprises a primary winding and a secondary winding, the number of turns of the primary winding is N1, the primary winding is divided into a first section of winding (N11) and a second section of winding (N12) by leading out a tap, the number of turns of the first section of winding (N11) and the number of turns of the second section of winding (N12) are determined according to the following two relations:

$$\frac{V1}{V2} = \frac{N11 + N12}{N12},$$

and N1=N11+N12, wherein, N11 represents the number of turns of the first section of winding which is between a first terminal (A) of the primary winding and the tap (P), N12 represents the number of turns of the second section of winding which is between the tap (P) and a second terminal (B) of the primary winding, V1 represents a voltage value of the first input source, V2 represents a voltage value of the second input source, and V1>V2; an anode of the first diode (D1) is connected to the first input source (V1) and a cathode thereof is connected to the first terminal (A) of the primary winding, an anode of the second diode (D2) is connected to the second input source (V2) and a cathode thereof is connected to the tap (P) of the primary winding, the second terminal (B) of the primary winding is grounded through the switching transistor (S1), and the secondary winding delivers energy to the rectifier and filter circuit and then to the load (R).

A two-input DC converter, supplying power by using one or both of a first input source (V1) and a second input source (V2); and during power supply, power supply energy of the second input source (V2) is insufficient to affect voltage fluctuation of the first input source (V1); wherein the two-input DC converter comprises: a second diode (D2), a transformer (T), a switching transistor (S1), a rectifier and filter circuit, and a load (R); the transformer (T) comprises a primary winding and a secondary winding, the number of turns of the primary winding is N1, the primary winding is divided into a first section of winding (N11) and a second section of winding (N12) by leading out a tap, and the number of turns of the first section of winding (N11) and the number of turns of the second section of winding (N12) are determined according to the following two relations:

$$\frac{V1}{V2} = \frac{N11 + N12}{N12},$$

and N1=N11+N12, wherein, N11 represents the number of turns of the first section of winding which is between a first terminal (A) of the primary winding and the tap (P), N12 represents the number of turns of the second section of winding which is between the tap (P) and a second terminal (B) of the primary winding, V1 represents a voltage value of the first input source, V2 represents a voltage value of the second input source, and V1>V2; the first input source (V1) is connected to the first terminal (A) of the primary winding, an anode of the second diode (D2) is connected to the second input source (V2) and a cathode thereof is connected to the tap (P) of the primary winding, the second terminal (B) of the primary winding is grounded through the switching transistor (S1), and the secondary winding delivers energy to the rectifier and filter circuit and then to the load (R).

The technical problems of the embodiments of the present application are solved through a further technical solution described in the following:

A multi-input DC converter, supplying power by using one or more of n input sources, wherein n≥3; and the multi-input DC converter comprises n diodes, a transformer (T), a switching transistor (S1), a rectifier and filter circuit, and a load (R); the transformer (T) comprises a primary winding and a secondary winding, the number of turns of the primary winding is N1, the primary winding is divided into n sections by leading out n−1 taps, and the numbers of turns of the n sections of windings are determined according to the following n relations:

$$\frac{V1}{V2} = \frac{N11 + N12 + N13 + \ldots + N1i + \ldots + N1n}{N12 + N13 + \ldots + N1i + \ldots + N1n}$$

$$\frac{V1}{V3} = \frac{N11 + N12 + N13 + \ldots + N1i + \ldots + N1n}{N13 + \ldots + N1i + \ldots + N1n}$$

$$\ldots$$

$$\frac{V1}{Vi} = \frac{N11 + N12 + N13 + \ldots + N1i + \ldots + N1n}{N1i + \ldots + N1n}$$

$$\ldots$$

$$\frac{V1}{Vn} = \frac{N11 + N12 + N13 + \ldots + N1i + \ldots + N1n}{N1n}, \text{ and}$$

$$N1 = N11 + N12 + N13 + \ldots + N1i + \ldots + N1n$$

wherein, i takes any value from 1 to n, $N1i$ represents the number of turns of the $i^{th}$ section of winding, Vi represents a voltage value of the $i^{th}$ input source, and V1>V2>V3> . . . >Vn; anodes of the n diodes are respectively connected to the n input sources in turn, cathodes of the n diodes are respectively connected to a first terminal (A) of the primary winding and n−1 tap terminals in turn, a second terminal (B) of the primary winding is grounded through the switching transistor (S1), and the secondary winding delivers energy to the rectifier and filter circuit and then to the load (R).

The technical problems of the embodiments of the present application are solved through a still further technical solution described in the following:

A bridgeless PFC circuit comprises a first inductor (L1A), a second inductor (L1B), a first switching transistor (S1), a second switching transistor (S2), a fifth diode (D5), a sixth diode (D6), a seventh diode (D7), and an output capacitor (Co). A first terminal of an input power source received by the bridgeless PFC circuit is connected to an anode of the fifth diode (D5) through the first inductor (L1A), a second terminal of the input power source is connected to an anode of the sixth diode (D6) through the second inductor (L1B), cathodes of the fifth diode (D5) and the sixth diode (D6) are connected to a first terminal of the output capacitor (Co), a second terminal of the output capacitor (Co) is connected to an anode of the seventh diode (D7), and a cathode of the seventh diode (D7) is connected to the anodes of the fifth diode (D5) and the sixth diode (D6) respectively through the first switching transistor (S1) and the second switching transistor (S2). The bridgeless PFC circuit further comprises the two-input DC converter described in the foregoing, the second terminal of the output capacitor (Co) is grounded, a voltage led out by the first terminal of the output capacitor (Co) serves as a first input source of the two-input DC converter, and a voltage led out by the cathode of the seventh diode (D7) serves as a second input source of the two-input DC converter.

A bridgeless PFC circuit comprises a first inductor (L1A), a first switching transistor (S1), a second switching transistor (S2), a fifth diode (D5), a sixth diode (D6), a seventh diode (D7), and an output capacitor (Co). A first terminal of an input power source received by the bridgeless PFC circuit is connected to an anode of the fifth diode (D5) through the first inductor (L1A), a second terminal of the input power source is connected to an anode of the sixth diode (D6), cathodes of the fifth diode (D5) and the sixth diode (D6) are connected to a first terminal of the output capacitor (Co), a second terminal of the output capacitor (Co) is connected to an anode of the seventh diode (D7), and a cathode of the seventh diode (D7) is connected to the anodes of the fifth diode (D5) and the sixth diode (D6) respectively through the first switching transistor (S1) and the second switching transistor (S2). The bridgeless PFC circuit further comprises the two-input DC converter described in the foregoing, the second terminal of the output capacitor (Co) is grounded, a voltage led out by the first terminal of the output capacitor (Co) serves as a first input source of the two-input DC converter, and a voltage led out by the cathode of the seventh diode (D7) serves as a second input source of the two-input DC converter.

A bridgeless PFC circuit comprises a first inductor (L1A), a second inductor (L1B), a first switching transistor (S1), a second switching transistor (S2), a third switching transistor (S3), a fourth switching transistor (S4), a seventh diode (D7), and an output capacitor (Co). A first terminal of an input power source received by the bridgeless PFC circuit is connected to a first terminal of the third switching transistor (S3) through the first inductor (L1A), a second terminal of the input power source is connected to a first terminal of the fourth switching transistor (S4) through the second inductor (L1B), second terminals of the third switching transistor (S3) and the fourth switching transistor (S4) are connected to a first terminal of the output capacitor (Co), a second terminal of the output capacitor (Co) is connected to an anode of the seventh diode (D7), and a cathode of the seventh diode (D7) is connected to the first terminals of the third switching transistor (S3) and the fourth switching transistor (S4) respectively through the first switching transistor (S1) and the second switching transistor (S2). The bridgeless PFC circuit further includes the two-input DC converter described in the foregoing, the second terminal of the output capacitor (Co) is grounded, a voltage led out by the first terminal of the output capacitor (Co) serves as a first input source of the two-input DC converter, and a voltage led out by the cathode of the seventh diode (D7) serves as a second input source of the two-input DC converter.

A bridgeless PFC circuit comprises a first inductor (L1A), a first switching transistor (S1), a second switching transistor (S2), a third switching transistor (S3), a fourth switching transistor (S4), a seventh diode (D7), and an output capacitor (Co). A first terminal of an input power source received by the bridgeless PFC circuit is connected to a first terminal of the third switching transistor (S3) through the first inductor (L1A), a second terminal of the input power source is connected to a first terminal of the fourth switching transistor (S4), second terminals of the third switching transistor (S3) and the fourth switching transistor (S4) are connected to a first terminal of the output capacitor (Co), a second terminal of the output capacitor (Co) is connected to an anode of the seventh diode (D7), and a cathode of the seventh diode (D7) is connected to the first terminals of the third switching transistor (S3) and the fourth switching transistor (S4) respectively through the first switching transistor (S1) and the second switching transistor (S2). The bridgeless PFC circuit further comprises the two-input DC converter described in the foregoing, the second terminal of the output capacitor (Co) is grounded, a voltage led out by the first terminal of the output capacitor (Co) serves as a first input source of the two-input DC converter, and a voltage led out by the cathode of the seventh diode (D7) serves as a second input source of the two-input DC converter.

Compared with the prior art, the embodiments of the present application may have the following beneficial effects:

In the two-input DC converter of the embodiments of the present application, the tap is led out from the primary winding of the transformer, the position of the tap is determined according to a voltage ratio relation of two to-be-received input sources, and by using the above setting, the two to-be-received input sources are respectively connected to the first terminal and the tap terminal of the primary winding of the transformer through the diodes, so as to implement power supply by one of the two input sources or power supply by both of them. For the circuit structure of the two-input DC converter in the embodiments of the present application, compared with the conventional single-input DC converter, the primary winding of the transformer only needs to be divided into two sections of windings according to the relation, without the need of multiple switching transistors; therefore, the circuit structure is simple, and the circuit cost is low. Similarly, the multi-input DC converter implements power supply of one or more of multiple input sources, the circuit structure is simple, and the cost is low. The two-input converter described in the foregoing is applied to the PFC circuit of the embodiments of the present application, thereby reducing voltage waveform oscillation of the diode in the PFC circuit, and improving the efficiency of the PFC circuit.

DETAILED DESCRIPTION

The present application is further described in detail through embodiments and accompanying drawings.

The First Embodiment

Figure 1:
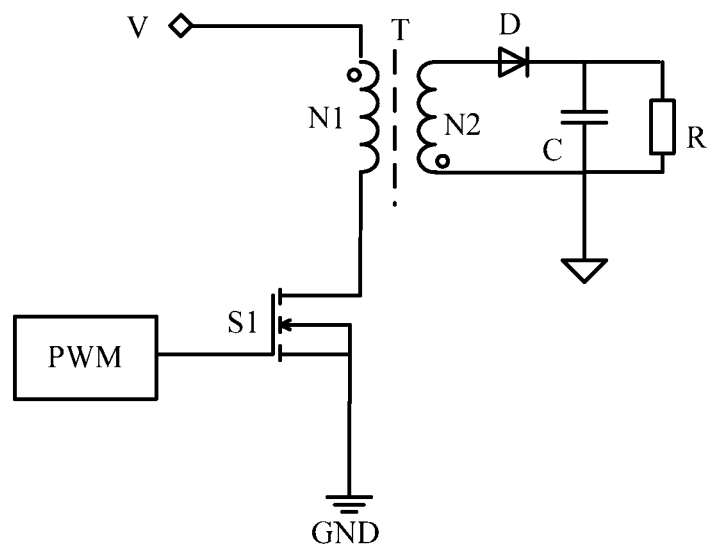
FIG. 1 is a circuit structure diagram of a DC converter in the prior art.
Figure 2:
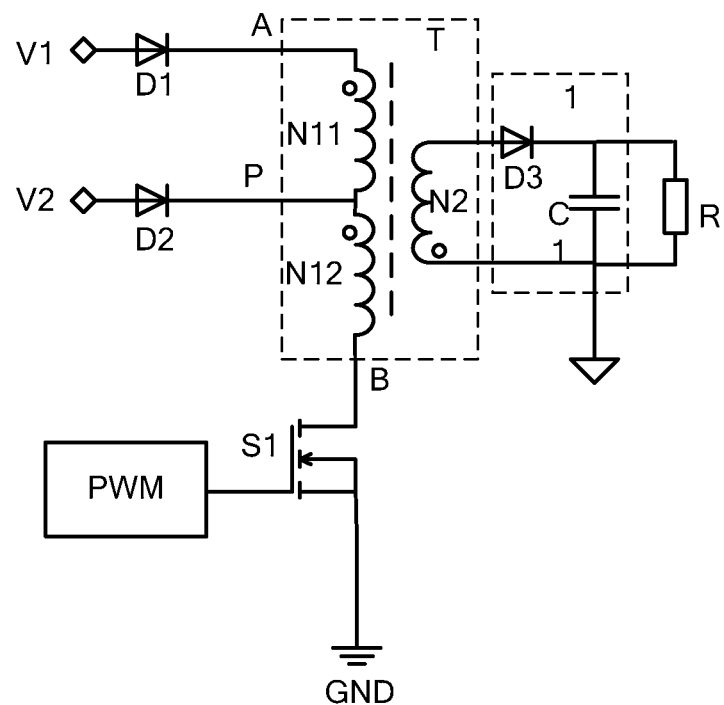
FIG. 2 is a circuit structure diagram of a two-input DC converter according to a first embodiment of the present application.

As shown in FIG. 2, a circuit structure diagram of a two-input DC converter in this embodiment is shown. The two-input DC converter comprises a first diode D1, a second diode D2, a transformer T, a switching transistor S1, a rectifier and filter circuit 1, and a load R. The two-input DC converter is used to introduce a first input source V1 and a second input source V2 having known voltage values into the circuit, and supplies power by using one or both of the two input sources.

The transformer T comprises a primary winding and a secondary winding N2, the number of turns of the primary winding is N1, and the primary winding is divided into a first section of winding N11 and a second section of winding N12 by leading out a tap P. A theoretic voltage value of the first input source V1, a theoretic voltage value of the second input source V2 and a value of the number N1 of turns of the primary winding are known, and values of the number of turns of the first section of winding N11 and the number of turns of the second section of winding N12 may be determined according to the following two relations:

$$\frac{V1}{V2} = \frac{N11 + N12}{N12}, \text{ and } N1 = N11 + N12$$

where, N11 represents the number of turns of the first section of winding which is between a first terminal A of the primary winding and the tap P, N12 represents the number of turns of the second section of winding which is between the tap P and a second terminal B of the primary winding, V1 represents a voltage value of the first input source, V2 represents a voltage value of the second input source, and V1>V2.

Therefore, the number N11 of turns of the first section of winding and the number N12 of turns of the second section of winding are obtained, thereby determining a position of the tap, so as to lead out the tap P.

After the tap P is led out, the first input source V1 and the second input source V2 are connected to the circuit, and the specific connection is as follows: an anode of the first diode D1 is connected to the first input source V1, a cathode thereof is connected to a first terminal A of the primary winding, an anode of the second diode D2 is connected to the second input source V2, a cathode thereof is connected to the tap P of the primary winding, a second terminal B of the primary winding is grounded through the switching transistor S1, and the secondary winding N2 delivers energy to the rectifier and filter circuit 1 and then to the load R. In this embodiment, the rectifier and filter circuit 1 comprises a third diode D3 and a filter capacitor C1, a first terminal of the secondary winding N2 is connected to an anode of the third diode D3, a cathode of the third diode D3 is connected to first terminals of the filter capacitor C1 and the load R, and a second terminal of the secondary winding is connected to second terminals of the filter capacitor C1 and the load R. Definitely, the rectifier and filter circuit 1 may adopt other specific circuit structures, which are not listed herein.

Circuit working principles of the two-input DC converter are described as follows:

Because the number N11 of turns of the first section of winding and the number N12 of turns of the second section of winding are determined according to theoretic values of the first input source V1 and the second input source V2, and during actual circuit working, received first input source V1 and second input source V2 both have some ripple voltages or spikes, actual values are not completely equal to the theoretic values. Therefore, the following 3 situations exist:

When an actual value V1' of the first input source V1 is greater than $$\frac{N11+N12}{N12}V2',$$

it is considered that an actual value V2' of the second input source V2 is equal to the theoretic value V2 thereof, and the actual value V1' of the first input source V1 is greater than the theoretic value V1 thereof. At this time, the two-input DC converter supplies power to the first section of winding N11 and second section of winding N12 of the primary winding of the transformer by using the first input source V1 through the first diode D1, the voltage obtained by the tap P is greater than the actual value of the second input source V2, and therefore, the second diode D2 is cut off. In cooperation with the switching transistor S1 which is under control of a PWM pulse wave, the DC converter supplies power by using the first input source V1, and delivers energy to the load R through the transformer.

When the actual value V1' of the first input source V1 is less than $$\frac{N11+N12}{N12}V2',$$

it is still considered that the actual value V2' of the second input source V2 is equal to the theoretic value V2 thereof, and the actual value V1' of the first input source V1 is less than the theoretic value V1 thereof. At this time, the two-input DC converter supplies power to the second section of winding N12 of the primary winding of the transformer by using the second input source V2 through the second diode D2; according to the magnetic induction law, a voltage value is also induced by the first section of winding N11 of the primary winding, the inductive voltage value and the voltage value at the tap P (that is, the actual value V2' of the second input source V2) are added to obtain the voltage at the first terminal A of the primary winding, which is greater than the actual value of the first input source V1, and therefore, the first diode D1 is cut off. In cooperation with the switching transistor S1 which is under control of the PWM pulse wave, the DC converter supplies power by using the second input source V2, and delivers energy to the load R through the transformer.

When the actual value V1' of the first input source V1 is equal to $$\frac{N11+N12}{N12}V2',$$

it is still considered that the actual value V2' of the second input source V2 is equal to the theoretic value V2 thereof, and the actual value V1' of the first input source V1 is equal to the theoretic value V1 thereof. At this time, in the two-input DC converter, the first input source V1 is applied to the first section of winding N11 and the second section of winding N12 of the primary winding of the transformer through the first diode D1, and the second input source V2 is applied to the second section of winding N12 of the primary winding of the transformer through the second diode D2. In cooperation with the switching transistor S1 which is under control of the PWM pulse wave, the DC converter supplies power by using the first input source V1 and the second input source V2, and delivers energy to the load R through the transformer.

Through analysis on the above working principles, it can be known that the DC converter may supply power by using one or both of the first input source V1 and the second input source V2, thereby implementing power supply of two power sources. Compared with the circuit implementing double power supply by using two single power supply converters in the prior art, or a two-input DC converter formed by setting multiple switching transistors in the prior art, the two-input DC converter in this embodiment only needs to lead out a tap from the primary winding of the transformer and add two diodes, so that the circuit structure is simple and the cost is low.

Figure 3:
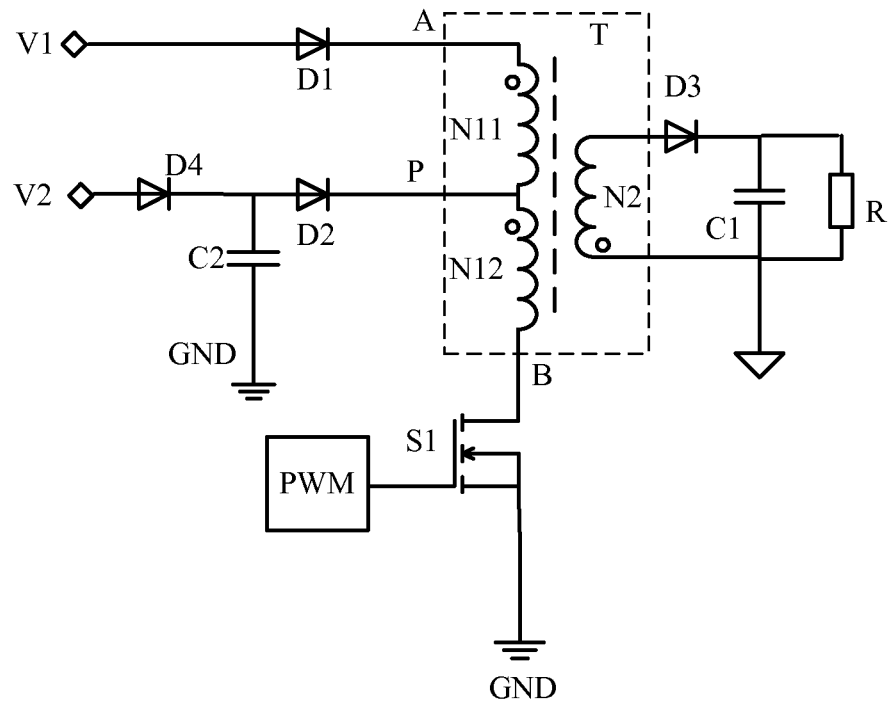
FIG. 3 is a circuit structure diagram of a two-input DC converter according to the first embodiment of the present application after a spike voltage absorption circuit is added.

Preferably, in order to absorb a large peak voltage of the second input source V2 to stabilize the voltage passing through the second diode D2, a spike voltage absorption circuit may be added. As shown in FIG. 3, the spike voltage absorption circuit comprises a fourth diode D4 and a second capacitor C2, an anode of the fourth diode D4 is connected to the second input source V2, a cathode of the fourth diode D4 is connected to a first terminal of the second capacitor C2 and the anode of the second diode D2, and a second terminal of the second capacitor C2 is grounded. It should be noted that, for an input source having a large peak voltage, the spike voltage absorption circuits may be used, so as to reduce spikes or ripples of the input voltage. For an input source having a small peak voltage, the spike voltage absorption circuit may be omitted.

It should be noted that, it can be seen from FIG. 2 that, the transformer T in this embodiment is connected to the circuit in a flyback manner so as to deliver energy, and according to the analysis on the circuit working principles, the connection manner of the transformer T does not affect the working of the circuit, and therefore, the connection manner of the transformer may also be a forward manner, or other manners.

The Second Embodiment

Figure 4:
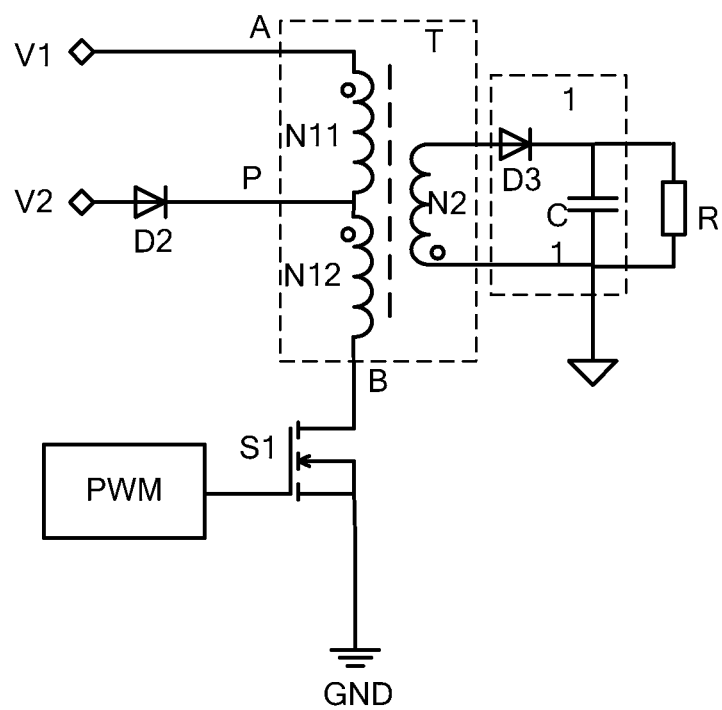
FIG. 4 is a circuit structure diagram of a two-input DC converter according to a second embodiment of the present application.

As shown in FIG. 4, a circuit structure diagram of a two-input DC converter according to this embodiment is shown, and a difference between this embodiment and the first embodiment lies in that: in this embodiment, during power supply, power supply energy of the second input source V2 is insufficient to affect voltage fluctuation of the first input source V1. For example, the two-input DC converter supplies 1000 W energy to the load R, wherein the first input source V1 supplies 999 W energy, and the second input source V2 only supplies 1 W energy; at this time, even if the power supplied by the second input source V2 flows back to the first input source V1, because the power supply energy of the second input source V2 is too small, the power flowed back does not affect the voltage fluctuation of the first input source V1; therefore, the first diode D1 may be omitted.

As shown in FIG. 4, the two-input DC converter comprises a second diode D2, a transformer T, a switching transistor S1, a rectifier and filter circuit, and a load R. In this embodiment, during power supply, the power supply energy of the second input source V2 is insufficient to affect voltage fluctuation of the first input source V1, so that the first diode D1 is omitted, the first input source V1 is directly connected to a first terminal A of the primary winding of the transformer T, and settings and connections of other components are the same as those in the first embodiment, which are not repeated herein.

In term of circuit working principles,

When an actual value V1' of the first input source V1 is greater than $$\frac{N11+N12}{N12}V2',$$

and the first input source V1 supplies power separately, the working principle is the same as that in the first embodiment, which is not repeated herein.

When the actual value V1' of the first input source V1 is less than $$\frac{N11+N12}{N12}V2',$$

and the second input source V2 supplies power separately, the two-input DC converter supplies power to a second section of winding N12 of the primary winding of the transformer by using the second input source V2 through the second diode D2, and according to the magnetic induction law, a voltage value is also induced by the first section of winding N11 of the primary winding, the inductive voltage value and the voltage value at the tap P (that is, the actual value V2' of the second input source V2) are added to obtain the voltage at the first terminal A of the primary winding, which is greater than the actual value of the first input source V1. At this time, although the cut-off function of the diode D1 does not exist, the power supply energy of the second input source V2 is small and does not affect the voltage fluctuation of the first input source V1, and therefore, does not affect the first input source V1. At this time, the circuit is still powered by the second input source V2 and works normally.

When the actual value V1' of the first input source V1 is equal to $$\frac{N11+N12}{N12}V2',$$

and the first input source V1 and the second input source V2 jointly supply power, the working principle is the same as that in the first embodiment, which is not repeated herein.

Through the above analysis, when the power supply energy of the second input source V2 is insufficient to affect the voltage fluctuation of the first input source V1, the first diode D1 may be omitted, and the circuit can still work normally.

The Third Embodiment

Figure 5:
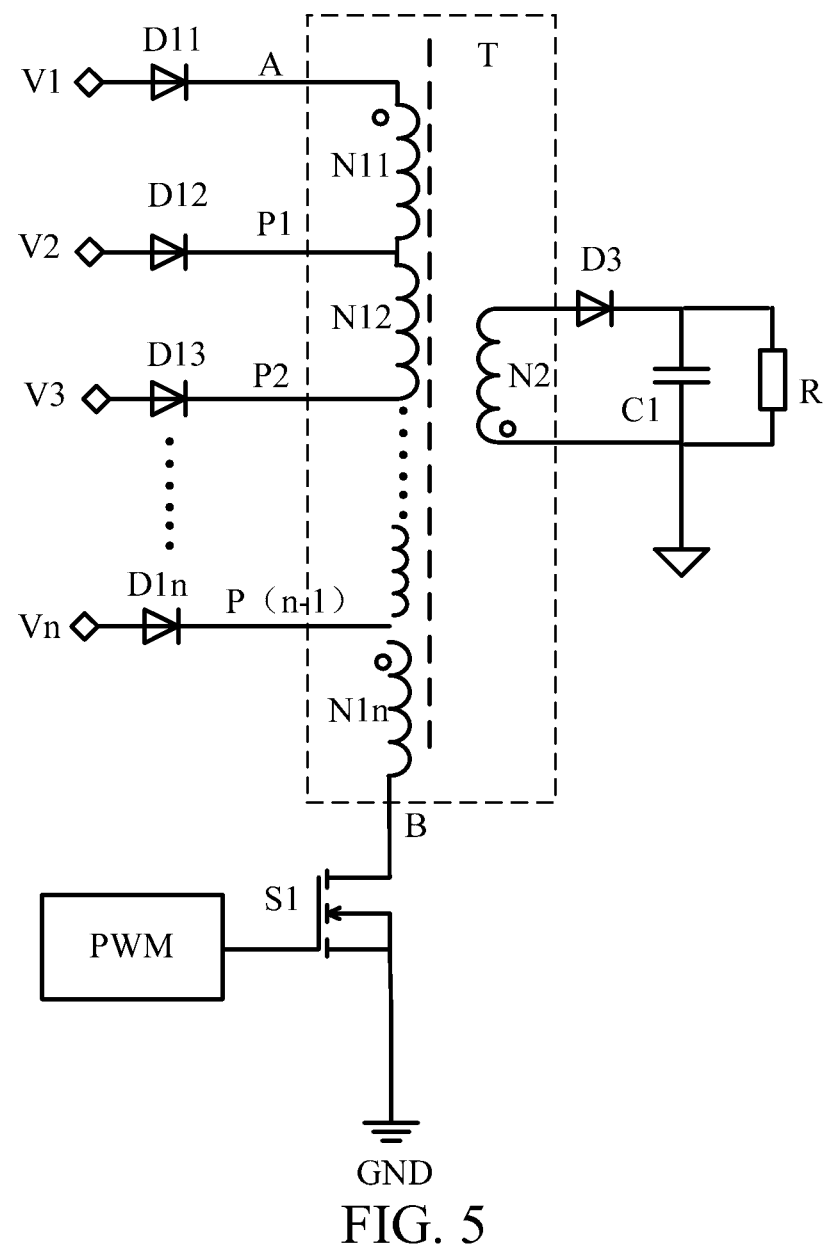
FIG. 5 is a circuit structure diagram of a multi-input DC converter according to a third embodiment of the present application.

As shown in FIG. 5, a circuit structure diagram of a multi-input DC converter according to this embodiment is shown. The multi-input DC converter comprises n diodes (diodes respectively marked as D11, D12, D13, . . . , D1n in the drawing), a transformer T, a switching transistor S1, a rectifier and filter circuit 1, and a load R. The multi-input DC converter is used to introduce n input sources (input sources respectively marked as V1, V2, V3, . . . , Vn in the drawing) having known voltage values into the circuit, and supply power by using one or more of the input sources.

The transformer T comprises a primary winding and a secondary winding N2, the number of turns of the primary winding is N1, the primary winding is divided into n sections of windings (windings respectively marked as N11, N12, . . . , N1n in the drawing) by leading out n−1 taps (taps respectively marked as P1, P2, . . . , P(n−1) in the drawing). Theoretic voltage values of the n input sources and a value of the number N1 of turns of the primary winding are known, so that values of the numbers of turns of the n sections of windings may be determined according to the following n relations:

$$\frac{V1}{V2} = \frac{N11+N12+N13+\ldots+N1i+\ldots+N1n}{N12+N13+\ldots+N1i+\ldots+N1n}$$

$$\frac{V1}{V3} = \frac{N11+N12+N13+\ldots+N1i+\ldots+N1n}{N13+\ldots+N1i+\ldots+N1n}$$

$$\ldots$$

$$\frac{V1}{Vi} = \frac{N11+N12+N13+\ldots+N1i+\ldots+N1n}{N1i+\ldots+N1n}$$

$$\ldots$$

$$\frac{V1}{Vn} = \frac{N11+N12+N13+\ldots+N1i+\ldots+N1n}{N1n}, \text{ and}$$

$$N1 = N11+N12+N13+\ldots+N1i+\ldots+N1n$$

wherein, i takes any value from 1 to n, N1i represents the number of turns of the $i^{th}$ section of winding, Vi represents a voltage value of the $i^{th}$ input source, and V1>V2>V3>. . . >Vn.

Therefore, the numbers (N11, N12, . . . , N1n) of turns of the n sections of windings may be obtained, so that positions of the taps may be determined, so as to lead out the n−1 taps P1, P2, . . . , P(n−1).

After the taps are led out, the n input sources are connected to the circuit, and the specific connection is as follows: anodes of the n diodes are respectively connected to the n input sources in turn (that is, an anode of the diode D11 is connected to the first input source V1, an anode of the diode D12 is connected to the second input source V2, an anode of the diode D13 is connected to the third input source V3, and the like), cathodes of the n diodes are respectively connected to a first terminal A of the primary winding and n−1 tap terminals in turn (that is, a cathode of the diode D11 is connected to the first terminal A of the primary winding, a cathode of the diode D12 is connected to the tap P1, a cathode of the diode D13 is connected to the tap P2, and the like), a second terminal B of the primary winding is grounded through the switching transistor S1, and the secondary winding N2 delivers the energy to the rectifier and filter circuit and then to the load R. This embodiment is the same as the first embodiment in that, the rectifier and filter circuit comprises a third diode D3 and a filter capacitor C1, a first terminal of the secondary winding N2 is connected to an anode of the third diode D3, a cathode of the third diode D3 is connected to first terminals of the filter capacitor C1 and the load R, and a second terminal of the secondary winding is connected to second terminals of the filter capacitor C1 and the load R.

Circuit working principles are described as follows:

Because the numbers N11, N12, . . . , N1n of turns of the n sections of windings are determined according to the theoretic values of the n input sources V1, V2, V3, . . . , Vn, and during actual circuit working, each received input source has some ripple voltages or spikes, actual values are not completely equal to the theoretic values. Therefore, the n input sources are respectively substituted into the following n formulas for calculation, $$V1', \frac{N11+N12+N13+\ldots+N1i+\ldots+N1n}{N12+N13+\ldots+N1i+\ldots+N1n}V2'$$

$$\frac{N11+N12+N13+\ldots+N1i+\ldots+N1n}{N13+\ldots+N1i+\ldots+N1n}V3', \ldots,$$

$$\frac{N11+N12+N13+\ldots+N1i+\ldots+N1n}{N1i+\ldots+N1n}Vi', \ldots, \text{and}$$

$$\frac{N11+N12+N13+\ldots+N1i+\ldots+N1n}{N1n}Vn',$$

and a magnitude relationship among the n formulas obtained through calculation determines a power supply source of the circuit: if a formula in the n formulas has the maximum value, a corresponding input source is used to supply power, and if several formulas have equally maximum values, several corresponding input sources are used to supply power.

For example, in a case that only one in the n input sources is used to supply power, for example, the second formula $$\frac{N11+N12+N13+\ldots+N1i+\ldots+N1n}{N12+N13+\ldots+N1i+\ldots+N1n}V2'$$

having the actual value V2' of the second input source substituted for calculation has the maximum value, the second input source is used to supply power for the N12, N13, ..., N1n sections of windings, voltages obtained by the taps P2 to P(n−1) are all greater than actual values V3' to Vn' of the correspondingly connected input sources, so that the diodes D13 to D1n are cut off. According to the magnetic induction law, a corresponding voltage value is also induced by the N11 section of winding, the inductive voltage value and the voltage value at the tap P (that is, the actual value V2' of the second input source V2) are added to obtain the voltage value at the first terminal A of the primary winding, which is greater than the actual value V1' of the correspondingly connected first input source, so that the diode D11 is cut off, thereby implementing that the circuit supplies power only with the participation of the second input source. In cooperation with the switching transistor S1 which is under control of the PWM pulse wave, the DC converter supplies power by using the second input source V2, and delivers energy to the load R through the transformer.

For another example, in a case that multiple input sources in the n input sources are used to supply power, for example, the second formula $$\frac{N11+N12+N13+\ldots+N1i+\ldots+N1n}{N12+N13+\ldots+N1i+\ldots+N1n}V2'$$

having the actual value V2' of the second input source substituted for calculation and the $n^{th}$ formula $$\frac{N11+N12+N13+\ldots+N1i+\ldots+N1n}{N1n}Vn'$$

having the actual value Vn' of the $n^{th}$ input source substituted for calculation have equally maximum values, similar to the above analysis, the second input source supplies power for the N12, N13, ..., N1(n−1), N1n sections of windings, and the $n^{th}$ input source supplies power for the N1n section of winding, and a voltage is induced by the N11 section of winding, and voltages obtained by the taps enable the diodes D13 to D1(n−1) to be in a cut-off state, and the inductive voltage enables the diode D11 to be in a cut-off state, thereby implementing that the circuit supplies power with the joint participation of the second input source and the $n^{th}$ input source. In cooperation with the switching transistor S1 which is under control of the PWM pulse wave, the DC converter supplies power by using the second input source V2 and the $n^{th}$ input source Vn, and delivers energy to the load R through the transformer.

For another example, in a case that the n input sources are used to supply power at the same time, at this time, n formulas having actual values of the input sources substituted for calculation all have the same value, and voltages at the first terminal A of the primary winding and at the taps are all equal to the actual values of the correspondingly connected input sources, so that the diodes are conducted, and the input sources all participate in power supply, thereby implementing that the circuit supplies power with the joint participation of the n input sources. In cooperation with the switching transistor S1 which is under control of the PWM pulse wave, the DC converter supplies power by using the n input sources, and delivers energy to the load R through the transformer Through analysis on the above working principles, it can be known that the DC converter may supply power by using one or more of the n input sources, thereby implementing power supply of a multi-input power source. Compared with a circuit of multi-input power supply implemented by using multiple single power supply converters in the prior art, the multi-input DC converter of this embodiment only needs to lead out n−1 taps from the primary winding of the transformer and add n diodes, so that the circuit structure is simple and the cost is low.

The Fourth Embodiment

Figure 6:
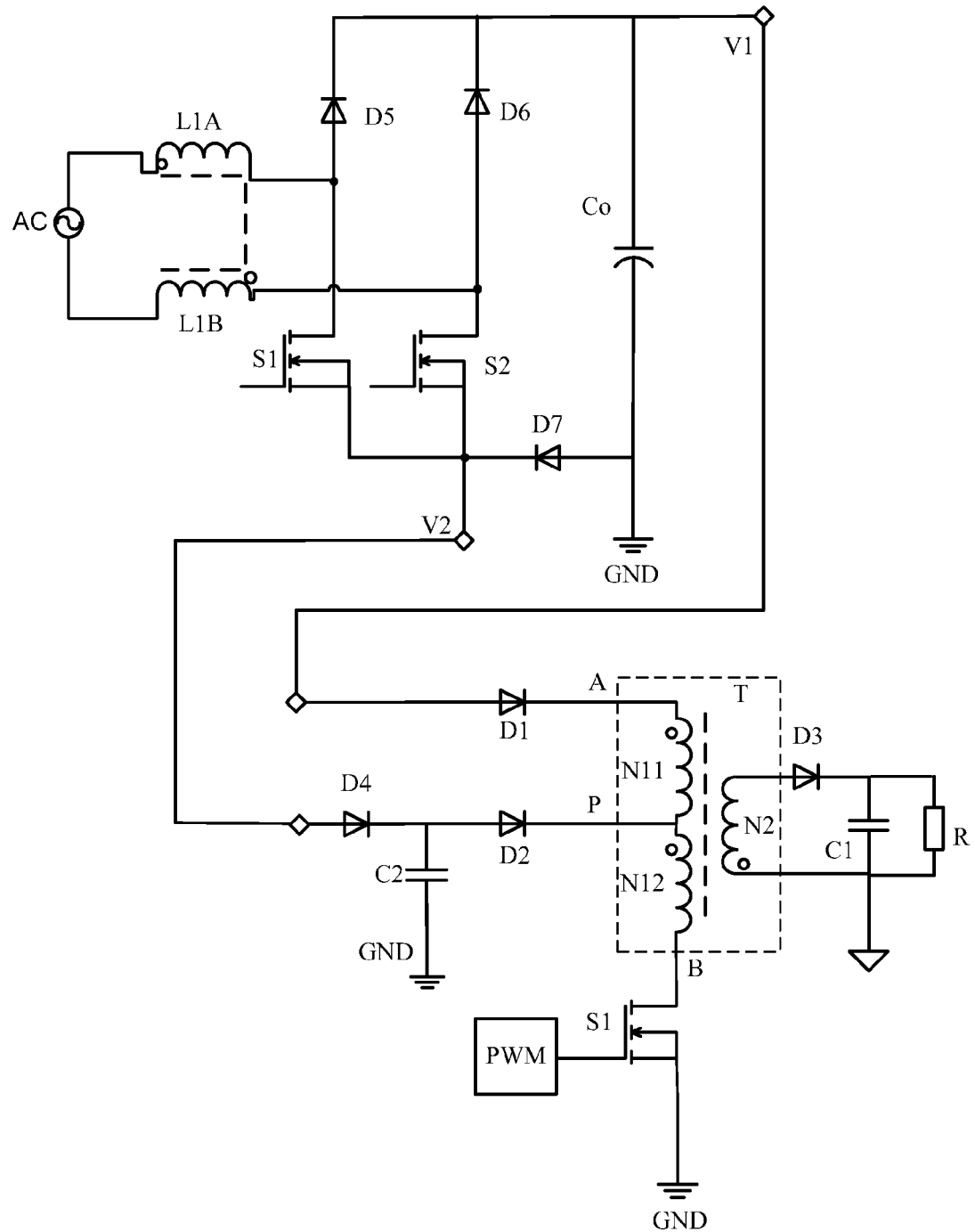
FIG. 6 is a circuit structure diagram of a bridgeless PFC circuit according to a fourth embodiment of the present application.

This embodiment is a bridgeless PFC circuit formed after a two-input DC converter is applied to a first bridgeless PFC circuit. As shown in FIG. 6, a circuit structure diagram of the PFC circuit in this embodiment is shown, and the PFC circuit comprises two parts, wherein the first part is a PFC basic circuit before the two-input DC converter is added, and the second part is the added two-input DC converter.

The PFC basic circuit comprises a first inductor L1A, a second inductor L1B, a first switching transistor S1, a second switching transistor S2, a fifth diode D5, a sixth diode D6, a seventh diode D7, and an output capacitor Co. A first terminal of an input power source AC received by the bridgeless PFC circuit is connected to an anode of the fifth diode D5 through the first inductor L1A, a second terminal of the input power source AC is connected to an anode of the sixth diode D6 through the second inductor L1B, cathodes of the fifth diode D5 and the sixth diode D6 are connected to a first terminal of the output capacitor Co, a second terminal of the output capacitor Co is connected to an anode of the seventh diode D7, and a cathode of the seventh diode D7 is connected to the anodes of the fifth diode D5 and the sixth diode D6 respectively through the first switching transistor S1 and the second switching transistor S2.

The added two-input DC converter is the preferred two-input DC converter having a spike voltage absorption circuit added in the first embodiment shown in FIG. 2, and compositions and connections thereof are the same as those in the first embodiment, and are not repeated herein. A connection between the two-input DC converter and the PFC basic circuit is that: the second terminal of the output capacitor Co of the PFC basic circuit is grounded, the voltage led out by the first terminal of the output capacitor Co serves as the first input source of the two-input DC converter, and the voltage led out by the cathode of the seventh diode D7 serves as the second input source of the two-input DC converter.

Figure 7:
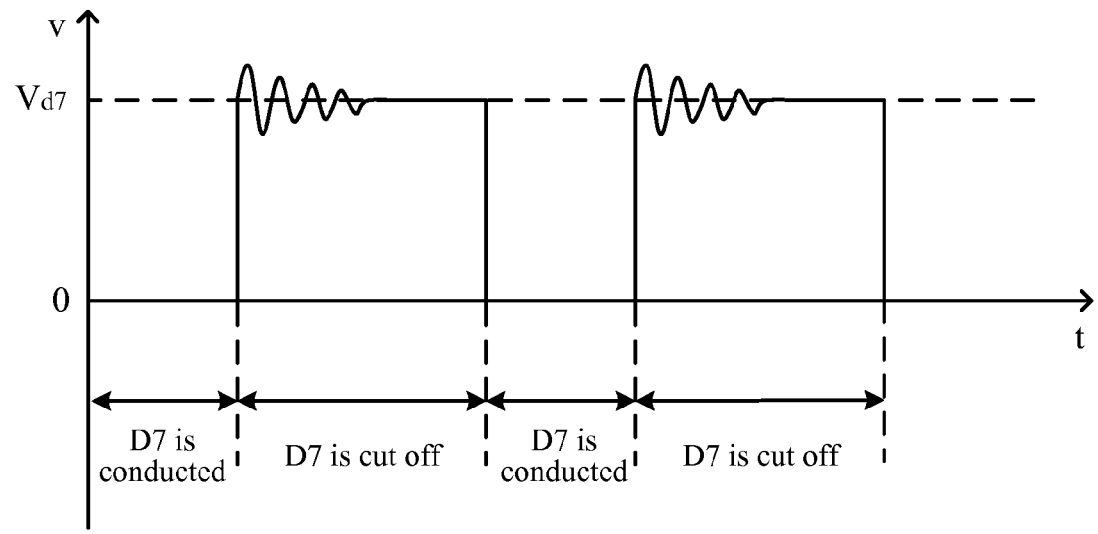
FIG. 7 is a voltage oscillogram at two ends of a seventh diode D7 of the bridgeless PFC according to the fourth embodiment of the present application when a basic circuit part is not connected to a two-input DC converter.

In the PFC basic circuit, the seventh diode D7, as a selective conduction unit, is only allowed to be conducted in an expected direction, so that a parasitic capacitor of the PFC basic circuit (comprising a parasitic capacitor of the first terminal of the output capacitor Co to the ground, a parasitic capacitor of the second terminal of the output capacitor to the ground, and equivalent parasitic capacitor between an input terminal and an output terminal of the PFC basic circuit) is not always in a charging and discharging state in a switching period of the switching transistor; in this way, the parasitic capacitor has a small charging current and a stable voltage value, so that common-mode noise can be reduced effectively, and EMI common-mode noise can also be lowered. However, for voltages at both terminals of the seventh diode D7, FIG. 7 shows a measured waveform of a voltage Vd7 at both terminals of the seventh diode D7 in the PFC basic circuit; it can be seen from the drawing that, the voltage Vd7 has a big oscillation. In order to eliminate the oscillation of the Vd7, a normal method is adding an RC absorption circuit between the two terminals of the seventh diode D7; however, although adding the RC absorption circuit may reduce the voltage stress of the seventh diode D7 and the EMI noise, energy of the oscillation is consumed and wasted by the RC. In this embodiment, a two-input DC converter is added, so as to deliver voltage oscillation energy of the seventh diode D7 to the load through the two-input DC converter. In this way, the oscillation energy of the seventh diode D7 in the PFC basic circuit is effectively used, thereby reducing the oscillation.

By analyzing the voltage of the seventh diode D7, it can be known that a high-level platform voltage thereof occurs when the first switching transistor S1 and the second switching transistor S2 are closed, and the D7 is cut off, and the seventh diode D7 is serially connected to the fifth diode D5 through the first switching transistor S1 (or the seventh diode D7 is serially connected to the sixth diode D6 through the second switching transistor S2) and then connected to two terminals of the output capacitor Co in parallel, and the seventh diode D7 is serially connected to the fifth diode D5 (or the sixth diode D6), so as to divide the voltage at the two terminals of the output capacitor Co, so that the voltage Vd7 on the second diode D7 is a half of the voltage at the two terminals of the Co, that is, the second input source V2 of the two-input DC converter in the drawing is equal to $$\frac{1}{2}V1.$$

Therefore, after this equation is substituted into the formula in the first embodiment for determining the numbers of turns of two sections of windings, the first section of winding $$N11 = \frac{1}{2}N1 \text{ and } N12 = \frac{1}{2}N1$$

may be obtained, and the tap P is drawn out from the middle of the primary winding.

Therefore, after the two-input DC converter is applied to the PFC basic circuit, the two-input DC converter works according to the following three situations:

When the actual value V1' of the first input source V1 is greater than 2V2', the two-input DC converter uses the first input source V1 to supply power for the first section of winding N11 and the second section of winding N12 of the primary winding of the transformer through the first diode D1, and in cooperation with the switching transistor S1 which is under control of the PWM pulse wave, delivers energy to the load R through the transformer.

When the actual value V1' of the first input source V1 is less than 2V2', the two-input DC converter uses the second input source V2 to supply power for the second section of winding N12 of the primary winding of the transformer through the second diode D2; according to the magnetic induction law, a voltage value is also induced by the first section of winding N11 of the primary winding, the inductive voltage value and the voltage value at the tap P (that is, the actual value V2' of the second input source V2) are added to obtain the voltage at the first terminal A of the primary winding, which is greater than the actual value of the first input source V1, and therefore, the first diode D1 is cut off. In cooperation with the switching transistor S1 which is under control of the PWM pulse wave, the DC converter delivers energy to the load R through the transformer.

When the actual value V1' of the first input source V1 is equal to 2V2', the two-input DC converter uses the first input source V1 to supply power for the first section of winding N11 and the second section of winding N12 of the primary winding of the transformer through the first diode D1, uses the second input source V2 to supply power for the second section of winding N12 of the primary winding of the transformer through the second diode D2, and in cooperation with the switching transistor S1 which is under control of the PWM pulse wave, delivers energy to the load R through the transformer.

Figure 8:
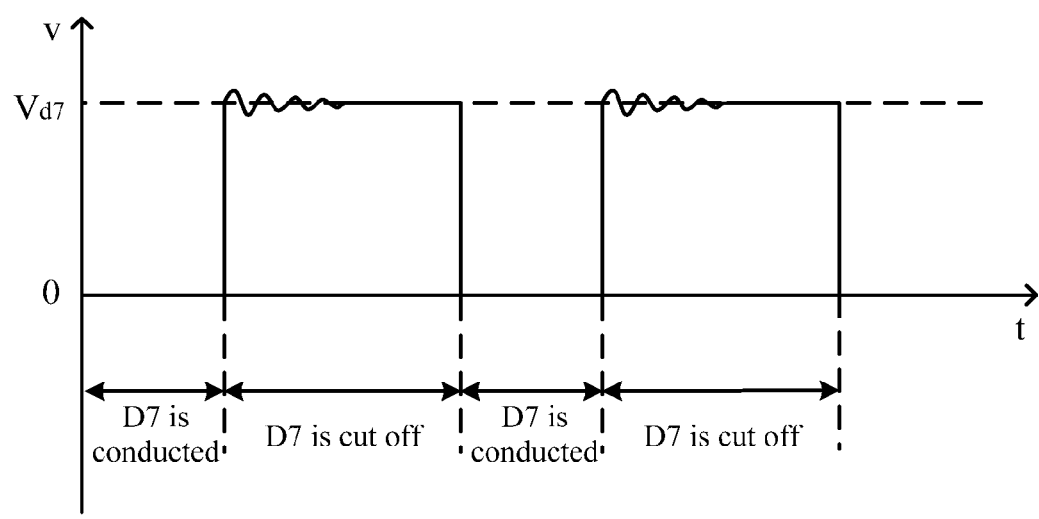
FIG. 8 is a voltage oscillogram at two ends of a seventh diode D7 of the bridgeless PFC according to the fourth embodiment of the present application after a basic circuit part is connected to a two-input DC converter.

Therefore, after the two-input DC converter is added to the PFC circuit, a waveform of the voltage Vd7 at two terminals of the seventh diode D7 in the PFC basic circuit is measured and shown in FIG. 8, and compared with FIG. 7, oscillation of the voltage Vd7 at two terminals of the seventh diode D7 is reduced. In other words, by switching power supply of the two-input DC converter between the first input source V1 and the second input source V2, oscillation energy on the seventh diode D7 in the PFC circuit is effectively used. In one aspect, for the PFC circuit, the oscillation is reduced; in the other aspect, for the two-input DC converter, the oscillation energy can be effective used to supply power for the load. Moreover, the two-input DC converter has a simple circuit structure and low cost, so that the PFC circuit to which the two-input DC converter is applied does not increase too much cost while reducing the voltage oscillation of the seventh diode.

The Fifth Embodiment

This embodiment is a bridgeless PFC circuit formed after a two-input DC converter is applied to a second bridgeless PFC circuit. The PFC circuit in this embodiment and the PFC circuit in the fourth embodiment use the same two-input DC converter, that is, the two-input DC converter in the first embodiment, and only the applied PFC basic circuits are slightly different. In the PFC basic circuit of the fourth embodiment, the inductor is consisted of the first inductor L1A and the second inductor L1B, while in the PFC basic circuit of this embodiment, the inductor is consisted of only one inductor L1A.

Figure 9:
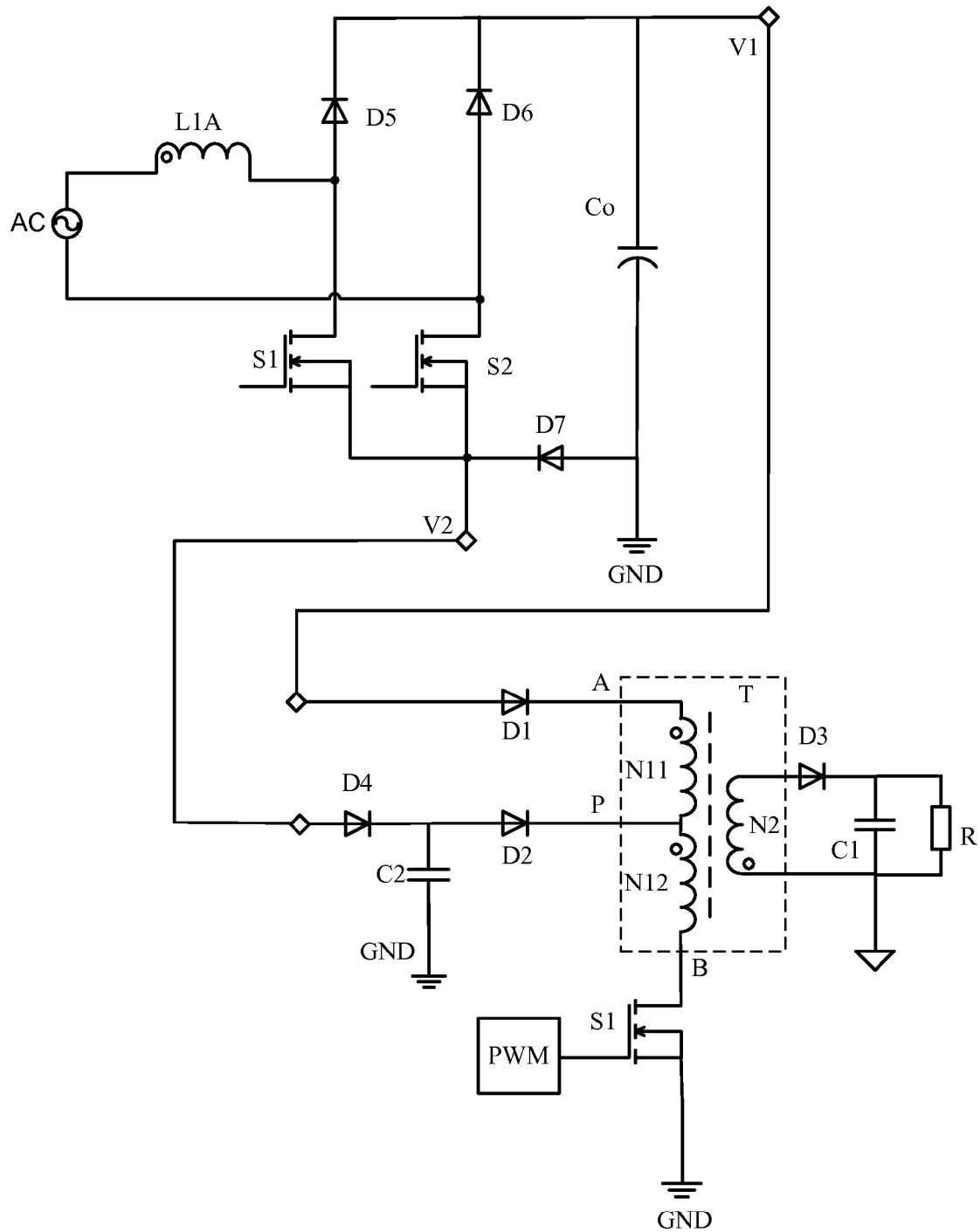
FIG. 9 is a circuit structure diagram of a bridgeless PFC circuit according to a fifth embodiment of the present application.

As shown in FIG. 9, a circuit structure diagram of the PFC circuit in this embodiment is shown. In term of circuit compositions and connections, other than the slightly different inductor part in the PFC basic circuit, compositions and connections of other parts are all the same as those of the fourth embodiment in FIG. 6, and are not repeated herein. The PFC basic circuit in this embodiment is implemented by using one inductor, so that the voltage stress on the seventh diode D7 is relatively greater than the voltage stress on the seventh diode D7 of the fourth embodiment in FIG. 6, and a diode having a large voltage stress needs to be selected as the seventh diode. The working principles of adding the two-input DC converter to reduce voltage oscillation energy of the seventh diode D7 and effectively deliver the oscillation energy to a load are the same as those in the fourth embodiment, and are not repeated herein.

The Sixth Embodiment

This embodiment is a bridgeless PFC circuit formed after a two-input DC converter is applied to a third bridgeless PFC circuit. The PFC circuit in this embodiment and the PFC circuit in the fourth embodiment use the same two-input DC converter, that is, the two-input DC converter in the first embodiment, and only the applied PFC basic circuits are slightly different. In this embodiment, a third switching transistor S3 and a fourth switching transistor S4 are used to replace the fifth diode D5 and the sixth diode D6 in the fourth embodiment, so as to form the PFC basic circuit part.

Figure 10:
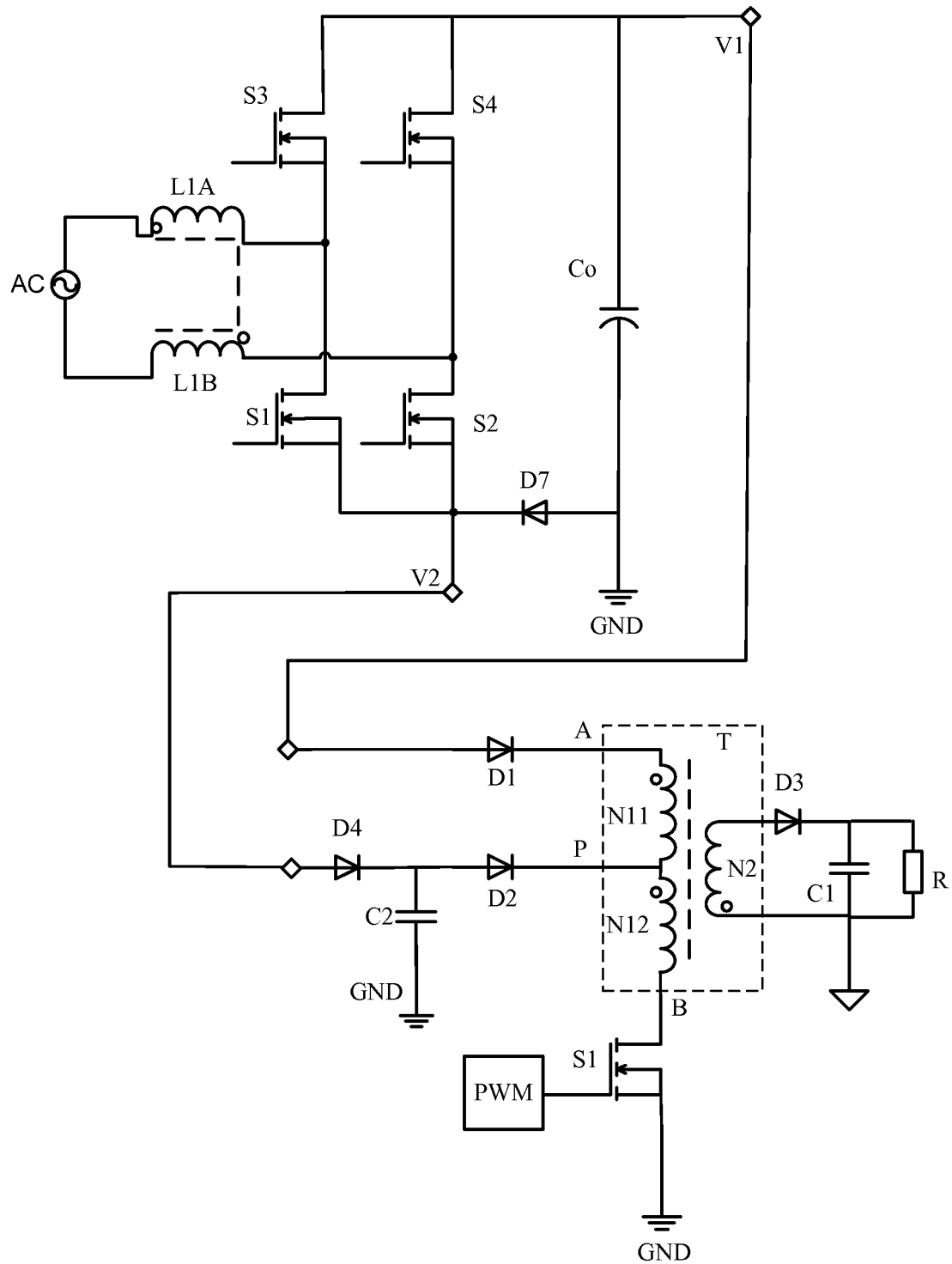
FIG. 10 is a circuit structure diagram of a bridgeless PFC circuit according to a sixth embodiment of the present application.

As shown in FIG. 10, a circuit structure diagram of the PFC circuit in this embodiment is shown. The bridgeless PFC circuit comprises two parts, and the first part is the PFC basic circuit, comprising a first inductor L1A, a second inductor L1B, a first switching transistor S1, a second switching transistor S2, a third switching transistor S3, a fourth switching transistor S4, a seventh diode D7, and an output capacitor Co. A first terminal of an input power source AC received by the bridgeless PFC circuit is connected to a first terminal of the third switching transistor S3 through the first inductor L1A, a second terminal of the input power source AC is connected to a first terminal of the fourth switching transistor S4 through the second inductor L1B, second terminals of the third switching transistor S3 and the fourth switching transistor S4 are connected to a first terminal of the output capacitor Co, a second terminal of the output capacitor Co is connected to an anode of the seventh diode D7, and a cathode of the seventh diode D7 is connected to the first terminals of the third switching transistor S3 and the fourth switching transistor S4 respectively through the first switching transistor S1 and the second switching transistor S2. The second part is the added two-input DC converter, which is the same as that in the fourth embodiment, also being the preferred two-input DC converter having a spike voltage absorption circuit added in the first embodiment shown in FIG. 2, and compositions and connections thereof are the same as those in the first embodiment, and are not repeated herein. A connection between the two-input DC converter and the PFC basic circuit is that: the second terminal of the output capacitor Co of the PFC basic circuit is grounded, the voltage led out by the first terminal of the output capacitor Co serves as the first input source of the two-input DC converter, and the voltage led out by the cathode of the seventh diode D7 serves as the second input source of the two-input DC converter.

The PFC basic circuit in this embodiment is different from the PFC basic circuit in the fourth embodiment. For the part involving working principles of the two-input DC converter, in the fourth embodiment, the seventh diode D7 is serially connected to the fifth diode D5 (or the sixth diode D6) for voltage division, and the second input source $$V2 = \frac{1}{2}V1.$$

In this embodiment, the seventh diode D7 is serially connected to the third switching transistor S3 (or the fourth switching transistor S4) for voltage division; although specific values of divided voltages are slightly different, the influence is small, and it can still be considered that the second input source $$V2 = \frac{1}{2}V1$$

after the voltage division. Therefore, the working principles of adding the two-input DC converter to reduce voltage oscillation energy of the seventh diode D7 and effectively deliver the oscillation energy to a load are the same as those in the fourth embodiment, and are not repeated herein.

The Seventh Embodiment

This embodiment is a bridgeless PFC circuit formed after a two-input DC converter is applied to a fourth bridgeless PFC circuit. The PFC circuit in this embodiment and the PFC circuit in the sixth embodiment use the same two-input DC converter, that is, the two-input DC converter in the first embodiment, and only the applied PFC basic circuits are slightly different. In the PFC basic circuit of the sixth embodiment, the inductor is consisted of the first inductor L1A and the second inductor L1B, while in the PFC basic circuit of this embodiment, the inductor is consisted of only one inductor L1A.

Figure 11:
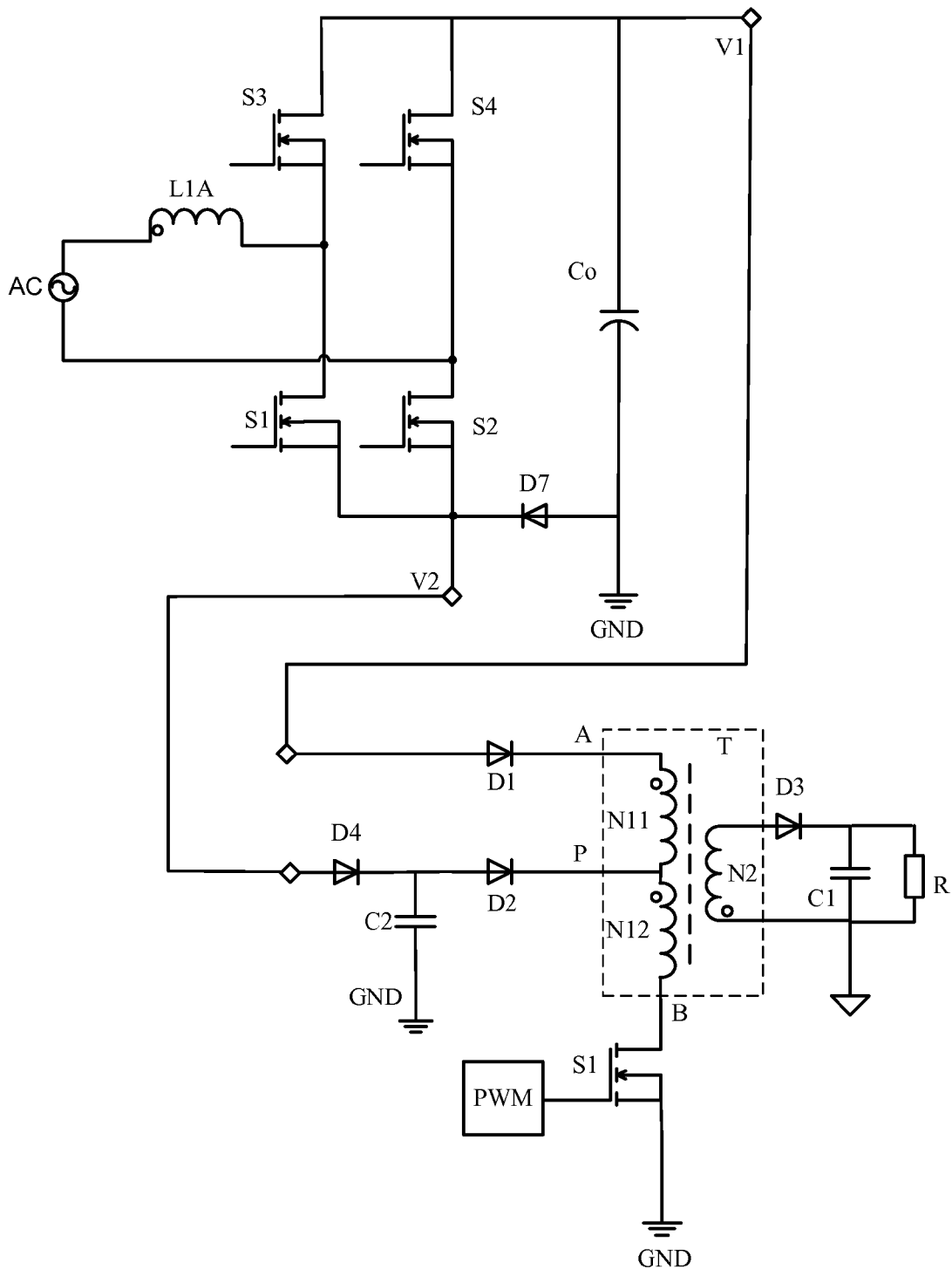
FIG. 11 is a circuit structure diagram of a bridgeless PFC circuit according to a seventh embodiment of the present application.

As shown in FIG. 11, a circuit structure diagram of the PFC circuit in this embodiment is shown. In term of circuit compositions and connections, other than the slightly different inductor part in the PFC basic circuit, compositions and connections of other parts are all the same as those of the sixth embodiment in FIG. 10, and are not repeated herein. The PFC basic circuit in this embodiment is implemented by using one inductor, so that the voltage stress on the seventh diode D7 is relatively greater than the voltage stress on the seventh diode D7 of the sixth embodiment in FIG. 10, and a diode having a large voltage stress needs to be selected as the seventh diode. The working principles of adding the two-input DC converter to reduce voltage oscillation energy of the seventh diode D7 and effectively deliver the oscillation energy to a load are the same as those in the fourth embodiment, and are not repeated herein.

The above contents are further detailed descriptions of the present application made through some embodiments, and it cannot be considered that specific implementations of the present application are limited to the descriptions. Persons of ordinary skill in the art can make several replacements or obvious variations having the same performance or usage without departing from the idea of the present application, and the replacements or obvious variations should all be considered as falling within the protection scope of the present application.

What is claimed is:

1. A two-input DC converter, supplying power by using one or both of a first input source and a second input source; and comprising: a first diode, a second diode, a transformer, a switching transistor, a rectifier and filter circuit, and a load, wherein the transformer comprises a primary winding and a secondary winding, the number of turns of the primary winding is N1, the primary winding is divided into a first section of winding and a second section of winding by leading out a tap, and the number of turns of the first section of winding and the number of turns of the second section of winding are determined according to the following two relations:

$$\frac{V1}{V2} = \frac{N11 + N12}{N12},$$

and N1=N11+N12, wherein, N11 represents the number of turns of the first section of winding which is between a first terminal of the primary winding and the tap, N12 represents the number of turns of the second section of winding which is between the tap and a second terminal of the primary winding, V1 represents a voltage value of the first input source, V2 represents a voltage value of the second input source, and V1>V2; and an anode of the first diode is connected to the first input source and a cathode thereof is connected to the first terminal of the primary winding, an anode of the second diode is connected to the second input source and a cathode thereof is connected to the tap of the primary winding, the second terminal of the primary winding is grounded through the switching transistor, and the secondary winding delivers energy to the rectifier and filter circuit and then to the load.

2. The two-input DC converter according to claim 1, wherein the rectifier and filter circuit comprises a third diode and a filter capacitor, a first terminal of the secondary winding is connected to an anode of the third diode, a cathode of the third diode is connected to first terminals of the filter capacitor and the load, and a second terminal of the secondary winding is connected to second terminals of the filter capacitor and the load.

3. The two-input DC converter according to claim 1, further comprising a spike voltage absorption circuit, the second input source being connected to the anode of the second diode through the spike voltage absorption circuit; the spike voltage absorption circuit comprising a fourth diode and a second capacitor, an anode of the fourth diode being connected to the second input source, a cathode of the fourth diode being connected to a first terminal of the second capacitor and the anode of the second diode, and a second terminal of the second capacitor being grounded.

4. A bridgeless PFC circuit, comprising a first inductor, a second inductor, a first switching transistor, a second switching transistor, a fifth diode, a sixth diode, a seventh diode, and an output capacitor, a first terminal of an input power source received by the bridgeless PFC circuit being connected to an anode of the fifth diode through the first inductor, a second terminal of the input power source being connected to an anode of the sixth diode through the second inductor, cathodes of the fifth diode and the sixth diode being connected to a first terminal of the output capacitor, a second terminal of the output capacitor being connected to an anode of the seventh diode, and a cathode of the seventh diode being connected to the anodes of the fifth diode and the sixth diode respectively through the first switching transistor and the second switching transistor, wherein the bridgeless PFC circuit further comprises the two-input DC converter according to claim 1, the second terminal of the output capacitor is grounded, a voltage led out by the first terminal of the output capacitor serves as a first input source of the two-input DC converter, and a voltage led out by the cathode of the seventh diode serves as a second input source of the two-input DC converter.

5. The bridgeless PFC circuit according to claim 4, wherein: the two-input DC converter further comprises a spike voltage absorption circuit, the second input source being connected to the anode of the second diode through the spike voltage absorption circuit; the spike voltage absorption circuit comprising a fourth diode and a second capacitor, an anode of the fourth diode being connected to the cathode of the seventh diode, a cathode of the fourth diode being connected to a first terminal of the second capacitor and the anode of the second diode, and a second terminal of the second capacitor being grounded.

6. A bridgeless PFC circuit, comprising a first inductor a first switching transistor, a second switching transistor, a fifth diode, a sixth diode, a seventh diode, and an output capacitor, a first terminal of an input power source received by the bridgeless PFC circuit being connected to an anode of the fifth diode through the first inductor, a second terminal of the input power source being connected to an anode of the sixth diode, cathodes of the fifth diode and the sixth diode being connected to a first terminal of the output capacitor, a second terminal of the output capacitor being connected to an anode of the seventh diode, and a cathode of the seventh diode being connected to the anodes of the fifth diode and the sixth diode respectively through the first switching transistor and the second switching transistor, wherein the bridgeless PFC circuit further comprises the two-input DC converter according to claim 1, the second terminal of the output capacitor is grounded, a voltage led out by the first terminal of the output capacitor serves as a first input source of the two-input DC converter, and a voltage led out by the cathode of the seventh diode serves as a second input source of the two-input DC converter.

7. A bridgeless PFC circuit, comprising a first inductor, a second inductor, a first switching transistor, a second switching transistor, a third switching transistor, a fourth switching transistor, a seventh diode, and an output capacitor, a first terminal of an input power source received by the bridgeless PFC circuit being connected to a first terminal of the third switching transistor through the first inductor, a second terminal of the input power source being connected to a first terminal of the fourth switching transistor through the second inductor, second terminals of the third switching transistor and the fourth switching transistor being connected to a first terminal of the output capacitor, a second terminal of the output capacitor being connected to an anode of the seventh diode, and a cathode of the seventh diode being connected to the first terminals of the third switching transistor and the fourth switching transistor respectively through the first switching transistor and the second switching transistor, wherein the bridgeless PFC circuit further comprises the two-input DC converter according to claim 1, the second terminal of the output capacitor is grounded, a voltage led out by the first terminal of the output capacitor serves as a first input source of the two-input DC converter, and a voltage led out by the cathode of the seventh diode serves as a second input source of the two-input DC converter.

8. A bridgeless PFC circuit, comprising a first inductor, a first switching transistor, a second switching transistor, a third switching transistor, a fourth switching transistor, a seventh diode, and an output capacitor, a first terminal of an input power source received by the bridgeless PFC circuit being connected to a first terminal of the third switching transistor through the first inductor, a second terminal of the input power source being connected to a first terminal of the fourth switching transistor, second terminals of the third switching transistor and the fourth switching transistor being connected to a first terminal of the output capacitor, a second terminal of the output capacitor being connected to an anode of the seventh diode, and a cathode of the seventh diode being connected to the first terminals of the third switching transistor and the fourth switching transistor respectively through the first switching transistor and the second switching transistor, wherein the bridgeless PFC circuit further comprises the two-input DC converter according to claim 1, the second terminal of the output capacitor is grounded, a voltage led out by the first terminal of the output capacitor serves as a first input source of the two-input DC converter, and a voltage led out by the cathode of the seventh diode serves as a second input source of the two-input DC converter.

9. A two-input DC converter, supplying power by using one or both of a first input source and a second input source; and during power supply, power supply energy of the second input source being insufficient to affect voltage fluctuation of the first input source, wherein the two-input DC converter comprises: a second diode, a transformer, a switching transistor, a rectifier and filter circuit, and a load, wherein, the transformer comprises a primary winding and a secondary winding, the number of turns of the primary winding is N1, the primary winding is divided into a first section of winding and a second section of winding by leading out a tap, and the number of turns of the first section of winding and the number of turns of the second section of winding are determined according to the following two relations:

$$\frac{V1}{V2} = \frac{N11 + N12}{N12},$$

and N1=N11+N12, wherein, N11 represents the number of turns of the first section of winding which is between a first terminal of the primary winding and the tap, N12 represents the number of turns of the second section of winding which is between the tap and a second terminal of the primary winding, V1 represents a voltage value of the first input source, V2 represents a voltage value of the second input source, and V1>V2; and the first input source is connected to the first terminal of the primary winding, an anode of the second diode is connected to the second input source and a cathode thereof is connected to the tap of the primary winding, the second terminal of the primary winding is grounded through the switching transistor, and the secondary winding delivers energy to the rectifier and filter circuit and then to the load.

10. A multi-input DC converter, supplying power by using one or more of n input sources, wherein n≥3; and comprising: n diodes, a transformer, a switching transistor, a rectifier and filter circuit, and a load, wherein, the transformer comprises a primary winding and a secondary winding, the number of turns of the primary winding is N1, the primary winding is divided into n sections by leading out n−1 taps, and the numbers of turns of the n sections of windings are determined according to the following n relations:

$$\frac{V1}{V2} = \frac{N11 + N12 + N13 + \ldots + N1i + \ldots + N1n}{N12 + N13 + \ldots + N1i + \ldots + N1n}$$

$$\frac{V1}{V3} = \frac{N11 + N12 + N13 + \ldots + N1i + \ldots + N1n}{N13 + \ldots + N1i + \ldots + N1n}$$

$$\ldots$$

$$\frac{V1}{Vi} = \frac{N11 + N12 + N13 + \ldots + N1i + \ldots + N1n}{N1i + \ldots + N1n}$$

$$\ldots$$

$$\frac{V1}{Vn} = \frac{N11 + N12 + N13 + \ldots + N1i + \ldots + N1n}{N1n}, \text{ and}$$

$$N1 = N11 + N12 + N13 + \ldots + N1i + \ldots + N1n$$

wherein, i takes any value from 1 to n, N1$i$ represents the number of turns of the $i^{th}$ section of winding, Vi represents a voltage value of the $i^{th}$ input source, and V1>V2>V3> . . . >Vn; and anodes of the n diodes are respectively connected to the n input sources in turn, cathodes of the n diodes are respectively connected to a first terminal of the primary winding and n−1 tap terminals in turn, a second terminal of the primary winding is grounded through the switching transistor, and the secondary winding delivers energy to the rectifier and filter circuit and then to the load.

* * * * *